US007058018B1

(12) United States Patent
Hasty, Jr. et al.

(10) Patent No.: US 7,058,018 B1
(45) Date of Patent: Jun. 6, 2006

(54) SYSTEM AND METHOD FOR USING PER-PACKET RECEIVE SIGNAL STRENGTH INDICATION AND TRANSMIT POWER LEVELS TO COMPUTE PATH LOSS FOR A LINK FOR USE IN LAYER II ROUTING IN A WIRELESS COMMUNICATION NETWORK

(75) Inventors: William Vann Hasty, Jr., Lake Forest, FL (US); Peter J. Stanforth, Winter Springs, FL (US)

(73) Assignee: MeshNetworks, Inc., Maitland, FL (US)

( * ) Notice: Subject to any disclaimer, the term of this patent is extended or adjusted under 35 U.S.C. 154(b) by 294 days.

(21) Appl. No.: 10/091,035

(22) Filed: Mar. 6, 2002

(51) Int. Cl.
*H04B 7/212* (2006.01)
*H04Q 7/00* (2006.01)
*H04Q 7/20* (2006.01)

(52) U.S. Cl. ................ 370/250; 370/331; 370/349; 455/450

(58) Field of Classification Search ........... 370/250, 370/328, 331–337, 252, 445, 447, 448, 461, 370/465, 522, 342–350, 479–503; 455/422, 455/226, 67, 69, 432–455, 515–524; 709/222, 709/250, 253
See application file for complete search history.

(56) References Cited

U.S. PATENT DOCUMENTS

| | | | |
|---|---|---|---|
| 4,494,192 A | 1/1985 | Lew et al. .................. 364/200 |
| 4,617,656 A | 10/1986 | Kobayashi et al. ........... 370/74 |
| 4,736,371 A | 4/1988 | Tejima et al. ................ 370/95 |
| 4,742,357 A | 5/1988 | Rackley ..................... 342/457 |
| 4,747,130 A | 5/1988 | Ho ............................. 379/269 |
| 4,910,521 A | 3/1990 | Mellon ....................... 342/45 |
| 5,034,961 A | 7/1991 | Adams ....................... 375/130 |

(Continued)

FOREIGN PATENT DOCUMENTS

CA        2132180        3/1996

(Continued)

OTHER PUBLICATIONS

Wong et al., "Soft Handoffs in CDMA Mobile Systems", Dec. 1997, IEEE Personal Communications.

(Continued)

*Primary Examiner*—Man U. Phan
(74) *Attorney, Agent, or Firm*—Randi L. Karpinia; Joseph J. Buczynski

(57) ABSTRACT

A system and method for evaluating at least one communication link between a transmitting node and a receiving node in a communications network, such as a wireless ad-hoc communications network in accordance with the 802.11 standard. The system and method perform the operation of assigning respective link quality values to the respective communication links based on a transmit power level (TPL) value at which the respective data packets were transmitted by the transmitting node over the respective links, a received sensitivity (RS) value of the receiving node receiving the data packets, and a receive signal strength indication (RSSI) value provided by the network for each respective link. The system and method can examine a content of a data packet being sent between the two nodes to determine the TPL, and can receive the RSSI value from a physical layer of the communications network. Accordingly, the system and method can determine which link that additional data packets are to be sent by the transmitting node to the receiving node via the communication link based on the link quality values. Specifically, the link having the highest link quality value is selected.

48 Claims, 5 Drawing Sheets

U.S. PATENT DOCUMENTS

| | | | |
|---|---|---|---|
| 5,068,916 A | 11/1991 | Harrison et al. ............... 455/39 |
| 5,231,634 A | 7/1993 | Giles et al. ................ 370/95.1 |
| 5,233,604 A | 8/1993 | Ahmadi et al. ............... 370/60 |
| 5,241,542 A | 8/1993 | Natarajan et al. .......... 370/95.3 |
| 5,317,566 A | 5/1994 | Joshi .......................... 370/60 |
| 5,392,450 A | 2/1995 | Nossen ..................... 455/12.1 |
| 5,412,654 A * | 5/1995 | Perkins ...................... 370/312 |
| 5,424,747 A | 6/1995 | Chazelas et al. .............. 342/70 |
| 5,491,837 A * | 2/1996 | Haartsen ...................... 455/62 |
| 5,502,722 A | 3/1996 | Fulghum .................. 370/69.1 |
| 5,517,491 A | 5/1996 | Nanni et al. .................. 370/29 |
| 5,555,425 A | 9/1996 | Zeller et al. ................ 395/800 |
| 5,555,540 A | 9/1996 | Radke ....................... 370/16.1 |
| 5,572,528 A | 11/1996 | Shuen .................... 370/85.13 |
| 5,615,212 A | 3/1997 | Ruszczyk et al. ........... 370/433 |
| 5,618,045 A | 4/1997 | Kagan et al. ................. 463/40 |
| 5,621,732 A | 4/1997 | Osawa ........................ 370/79 |
| 5,623,495 A | 4/1997 | Eng et al. ................... 370/397 |
| 5,627,976 A | 5/1997 | McFarland et al. ......... 395/308 |
| 5,631,897 A | 5/1997 | Pacheco et al. ............. 370/237 |
| 5,644,576 A | 7/1997 | Bauchot et al. ............. 370/437 |
| 5,652,751 A | 7/1997 | Sharony .................... 370/227 |
| 5,680,392 A | 10/1997 | Semaan ..................... 370/261 |
| 5,684,794 A | 11/1997 | Lopez et al. ................ 370/337 |
| 5,687,194 A | 11/1997 | Paneth et al. ............... 375/283 |
| 5,696,903 A | 12/1997 | Mahany ................ 395/200.58 |
| 5,697,056 A * | 12/1997 | Tayloe ........................ 455/513 |
| 5,701,294 A | 12/1997 | Ward et al. ................. 370/252 |
| 5,706,428 A | 1/1998 | Boer et al. .................. 395/200 |
| 5,717,689 A | 2/1998 | Ayanoglu ................... 370/349 |
| 5,732,077 A * | 3/1998 | Whitehead ................. 370/349 |
| 5,745,483 A | 4/1998 | Nakagawa et al. ......... 370/335 |
| 5,768,684 A * | 6/1998 | Grubb et al. ............... 455/13.4 |
| 5,774,876 A | 6/1998 | Woolley et al. ................ 705/28 |
| 5,781,540 A | 7/1998 | Malcolm et al. ............ 370/321 |
| 5,787,080 A | 7/1998 | Hulyalkar et al. .......... 370/348 |
| 5,794,154 A | 8/1998 | Bar-On et al. .............. 455/509 |
| 5,796,732 A | 8/1998 | Mazzola et al. ............. 370/362 |
| 5,796,741 A | 8/1998 | Saito et al. .................. 370/439 |
| 5,805,593 A | 9/1998 | Busche ....................... 370/396 |
| 5,805,842 A | 9/1998 | Nagaraj et al. ............. 395/306 |
| 5,805,977 A | 9/1998 | Hill et al. ................... 455/31.3 |
| 5,809,518 A | 9/1998 | Lee ............................ 711/115 |
| 5,822,309 A | 10/1998 | Ayanoglu et al. ........... 370/315 |
| 5,844,905 A | 12/1998 | McKay et al. .............. 370/443 |
| 5,845,097 A | 12/1998 | Kang et al. ................. 395/297 |
| 5,857,084 A | 1/1999 | Klein ......................... 395/309 |
| 5,862,345 A * | 1/1999 | Okanoue et al. ............ 709/238 |
| 5,870,350 A | 2/1999 | Bertin et al. ................ 365/233 |
| 5,877,724 A | 3/1999 | Davis ......................... 342/357 |
| 5,881,095 A | 3/1999 | Cadd ......................... 375/202 |
| 5,881,372 A | 3/1999 | Kruys ........................ 455/113 |
| 5,886,992 A | 3/1999 | Raatikainen et al. ....... 370/410 |
| 5,896,561 A | 4/1999 | Schrader et al. ........... 455/67.1 |
| 5,903,559 A | 5/1999 | Acharya et al. ............ 370/355 |
| 5,909,651 A | 6/1999 | Chander et al. ............ 455/466 |
| 5,936,953 A | 8/1999 | Simmons .................... 370/364 |
| 5,943,322 A | 8/1999 | Mayor et al. ............... 370/280 |
| 5,960,335 A * | 9/1999 | Umemoto et al. ........... 455/226 |
| 5,987,011 A * | 11/1999 | Toh ............................ 370/331 |
| 5,987,033 A | 11/1999 | Boer et al. .................. 370/445 |
| 5,991,279 A | 11/1999 | Haugli et al. ............... 370/311 |
| 6,021,125 A * | 2/2000 | Sakoda et al. .............. 370/345 |
| 6,028,853 A | 2/2000 | Haartsen .................... 370/338 |
| 6,029,217 A | 2/2000 | Arimilli et al. ............. 710/107 |
| 6,034,542 A | 3/2000 | Ridgeway ................... 326/39 |
| 6,035,183 A * | 3/2000 | Todd et al. .................. 455/226 |
| 6,044,062 A | 3/2000 | Brownrigg et al. ......... 370/238 |
| 6,047,330 A | 4/2000 | Stracke, Jr. ................. 709/238 |
| 6,052,594 A | 4/2000 | Chuang et al. .............. 455/450 |
| 6,052,752 A | 4/2000 | Kwon ........................ 710/126 |
| 6,058,107 A * | 5/2000 | Love et al. .................. 370/332 |
| 6,064,626 A | 5/2000 | Stevens ...................... 365/233 |
| 6,067,291 A | 5/2000 | Kamerman et al. ......... 370/338 |
| 6,078,566 A | 6/2000 | Kikinis ....................... 370/286 |
| 6,104,712 A | 8/2000 | Robert et al. ............... 370/389 |
| 6,108,738 A | 8/2000 | Chambers et al. .......... 710/113 |
| 6,115,580 A | 9/2000 | Chuprun et al. ............... 455/1 |
| 6,122,690 A | 9/2000 | Nannetti et al. ............ 710/102 |
| 6,130,881 A | 10/2000 | Stiller et al. ................ 370/238 |
| 6,132,306 A | 10/2000 | Trompower ................ 453/11.1 |
| 6,137,993 A | 10/2000 | Almgren et al. |
| 6,138,024 A * | 10/2000 | Evans et al. ................. 455/452 |
| 6,147,975 A | 11/2000 | Bowman-Amuah ......... 370/252 |
| 6,157,616 A * | 12/2000 | Whitehead ................. 370/252 |
| 6,163,699 A | 12/2000 | Naor et al. .................. 455/453 |
| 6,175,745 B1 * | 1/2001 | Bringby et al. ............. 455/522 |
| 6,178,337 B1 | 1/2001 | Spartz et al. ............... 455/561 |
| 6,192,053 B1 | 2/2001 | Angelico et al. ........... 370/448 |
| 6,192,230 B1 | 2/2001 | van Bokhorst et al. ..... 455/343 |
| 6,208,870 B1 | 3/2001 | Lorello et al. .............. 455/466 |
| 6,223,240 B1 | 4/2001 | Odenwald et al. .......... 710/129 |
| 6,240,294 B1 | 5/2001 | Hamilton et al. ........... 455/456 |
| 6,246,875 B1 | 6/2001 | Seazholtz et al. ........... 455/432 |
| 6,249,516 B1 | 6/2001 | Brownrigg et al. ......... 370/338 |
| 6,275,707 B1 | 8/2001 | Reed et al. .................. 455/456 |
| 6,285,892 B1 | 9/2001 | Hulyalkar ................... 455/574 |
| 6,304,556 B1 | 10/2001 | Haas .......................... 370/254 |
| 6,307,843 B1 * | 10/2001 | Okanoue .................... 370/312 |
| 6,327,300 B1 | 12/2001 | Souissi et al. .............. 375/219 |
| 6,349,091 B1 | 2/2002 | Li ............................... 370/238 |
| 6,349,210 B1 | 2/2002 | Li ............................... 455/450 |
| 6,498,932 B1 * | 12/2002 | Silventoinen et al. ....... 455/424 |
| 6,498,934 B1 * | 12/2002 | Muller ........................ 455/450 |
| 6,512,935 B1 * | 1/2003 | Redi .......................... 455/574 |
| 6,519,236 B1 * | 2/2003 | Haartsen et al. ............ 370/332 |
| 6,678,252 B1 * | 1/2004 | Cansever .................... 370/253 |
| 6,735,448 B1 * | 5/2004 | Krishnamurthy et al. ... 455/522 |
| 6,829,226 B1 * | 12/2004 | Apostolides et al. ....... 370/318 |
| 2001/0053699 A1 | 12/2001 | McCrady et al. ........... 455/513 |
| 2002/0071395 A1 * | 6/2002 | Redi et al. .................. 370/252 |
| 2004/0059825 A1 * | 3/2004 | Edwards et al. ............ 709/230 |

FOREIGN PATENT DOCUMENTS

| | | |
|---|---|---|
| EP | 0513842 A2 | 11/1992 |
| EP | 0627827 A2 | 12/1994 |
| EP | 0924890 A2 | 6/1999 |
| FR | 2683326 | 7/1993 |
| WO | WO 9608884 | 3/1996 |
| WO | WO 9724005 | 7/1997 |
| WO | WO 9839936 | 9/1998 |
| WO | WO 99123052 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

Wong et al., "A Pattern Recognition System for Handoff Algorithms", Jul. 2000, IEEE Journal on Selected Areas in Communications, vol. 18, No. 7.

Andras G. Valko, "Cellular IP: A New Approach to Internet Host Mobility", Jan. 1999, ACM Computer Communication Review.

Richard North, Dale Bryan and Dennis Baker, "Wireless Networked Radios: Comparison of Military, Commercial, and R&D Protocols", Feb. 28-Mar. 3, 1992, 2$^{nd}$ Annual UCSD Conference on Wireless Communications, San Diego CA.

Benjamin B. Peterson, Chris Kmiecik, Richard Hartnett, Patrick M. Thompson, Jose Mendoza and Hung Nguyen, "Spread Spectrum Indoor Geolocation", Aug. 1998, Navigation: Journal of the Institute of Navigation, vol. 45, No. 2, summer 1998.

Josh Broch, David A. Maltz, David B. Johnson, Yih-Chun Hu and Jorjeta Jetcheva, "A Performance Comparison of Multi-Hop Wireless Ad Hoc Network Routing Protocols", Oct. 25-30, 1998, Proceedings of the 4th Annual ACM/IEEE International Conference on Mobile Computing and Networking.

C. David Young, "USAP: A Unifying Dynamic Distributed Multichannel TDMA Slot Assignment Protocol".

Chip Elliott and Bob Heile, "Self-Organizing, Sef-Healing Wireless Networks", 2000 IEEE.

J.J. Garcia-Luna-Aceves and Asimakis Tzamaloukas, "Reversing the Collision-Avoidance Handshake in Wireless Networks".

J.J. Garcia-Luna-Aceves and Marcelo Spohn, "Transmission-Efficient Routing in Wireless Networks Using Link-State Information".

J.J. Garcia-Luna-Aceves and Ewerton L. Madruga, "The Core-Assisted Mesh Protocol", Aug. 1999, IEEE Journal on Selected Areas in Communications, vol. 17, No. 8.

Ad Kamerman and Guido Aben, "Net Throughput with IEEE 802.11 Wireless LANs".

J.R. McChesney and R.J. Saulitis, "Optimization of an Adaptive Link Control Protocol for Multimedia Packet Radio Networks".

Ram Ramanathan and Regina Rosales-Hain, "Topology Control of Multihop Wireless Networks using Transmit Power Adjustment".

Ram Ramanathan and Martha E. Steenstrup, "Hierarchically-Organized, Multihop Mobile Wireless Networks for Quality-of-Service Support".

Martha E. Steenstrup, "Dynamic Multipoint Virtual Circuits for Multimedia Traffic in Multihop Mobile Wireless Networks".

Zhenyu Tang and J.J. Garcia-Luna-Aceves, "Collision-Avoidance Transmission Scheduling for Ad-Hoc Networks".

George Vardakas and Wendell Kishaba, "QoS Networking With Adaptive Link Control and Tactical Multi-Channel Software Radios".

* cited by examiner

SYSTEM AND METHOD FOR USING PER-PACKET RECEIVE SIGNAL STRENGTH INDICATION AND TRANSMIT POWER LEVELS TO COMPUTE PATH LOSS FOR A LINK FOR USE IN LAYER II ROUTING IN A WIRELESS COMMUNICATION NETWORK

BACKGROUND OF THE INVENTION

1. Field of the Invention

The present invention relates to a system and method for using a receive signal strength indication and a transmit power level to determine the integrity of a link for use in Layer II routing in a network, such as an 802.11 network. More particularly, the present invention relates to a system and method for using indications of per-packet receive signal strengths and per-packet transmit power levels to compute path losses for links between nodes in a communication network, such as an 802.11 network, in order to select the most suitable link over which to send data packets between the nodes.

2. Description of the Related Art

In recent years, a type of mobile communications network known as an "ad-hoc" network has been developed. In this type of network, each user terminal (hereinafter "mobile node") is capable of operating as a base station or router for the other mobile nodes, thus eliminating the need for a fixed infrastructure of base stations. Accordingly, data packets being sent from a source mobile node to a destination mobile node are typically routed through a number of intermediate mobile nodes before reaching the destination mobile node. Details of an ad-hoc network are set forth in U.S. Pat. No. 5,943,322 to Mayor, the entire content of which is incorporated herein by reference.

More sophisticated ad-hoc networks are also being developed which, in addition to enabling mobile nodes to communicate with each other as in a conventional ad-hoc network, further enable the mobile nodes to access a fixed network and thus communicate with other types of user terminals, such as those on the public switched telephone network (PSTN) and on other networks such as the Internet. Details of these types of ad-hoc networks are described in U.S. patent application Ser. No. 09/897,790 entitled "Ad Hoc Peer-to-Peer Mobile Radio Access System Interfaced to the PSTN and Cellular Networks", filed on Jun. 29, 2001, in U.S. patent application Ser. No. 09/815,157 entitled "Time Division Protocol for an Ad-Hoc, Peer-to-Peer Radio Network Having Coordinating Channel Access to Shared Parallel Data Channels with Separate Reservation Channel", filed on Mar. 22, 2001, and in U.S. patent application Ser. No. 09/815,164 entitled "Prioritized-Routing for an Ad-Hoc, Peer-to-Peer, Mobile Radio Access System", filed on Mar. 22, 2001, the entire content of each of said patent applications being incorporated herein by reference.

As can be appreciated by one skilled in the art, when a node sends packetized data to a destination node, the node typically checks its routing table to determine whether the destination node is contained in its routing table. If the destination node is contained in the node's routing table, the data is transmitted via a path that leads to the destination node. If the destination node is not listed in the node's routing table, then the packet is sent to one or more other nodes listed in the node's routing table, and those other nodes determine if the destination table is listed in their routing tables. The process continues until the data packet eventually reaches the destination node.

In these types of ad-hoc networks, the algorithms that are used to determine the path of intermediate nodes via which the data packets are routed between source and destination nodes are typically based on the shortest distance between the source and destination nodes or, assuming that the data packet transport medium is wireless, the least power required to perform the routing. However, such algorithms do not necessarily produce a predictable delivery of data packets. For example, routing of data packets can be delayed due to congestion in intermediate nodes. Also, delivery failure of data packets can occur on noisy radio links between nodes. Moreover, because many of the nodes are mobile, the conditions of the links can be constantly changing.

In addition, other factors such as the signal strength at which a data-packet is received by a node over a link, as well as the power level at which the node finds it necessary to transmit a data-packet over the link, provide an indication of the integrity of the link. Currently, ad-hoc wireless communications networks, and especially those employing terminals which operate in accordance with 802.11 standards, do not take into account the received signal strength or the transmitted power level when determining the suitability of a link for use in sending data packets between nodes. Details of the 802.11 standards are set forth in ISO/IEC 8802-11, ANSI/IEEE 802.11 "Information Technology—Telecommunications and Information Exchange Between Systems—Local and Metropolitan Area Network Specific Requirements", Part 11: Wireless Medium Access Control (MAC) and Physical Layer (PHY) Specifications, the entire contents of which being incorporated herein by reference. Also, a description of the 802.11 standard is found in a book by Bob O'Hara and Al Petrick entitled *IEEE 802.11 Handbook: A Designer's Companion*, IEEE, 1999, the entire contents of which being incorporated herein by reference.

Accordingly, a need exists for a system and method which enables wireless ad-hoc communications network, such as an 802.11 network, to evaluate the integrity of a link between nodes based on the strength at which a signal is received over the link and transmission power level at which a signal is transmitted over the link, in order to determine whether to use the link for data packet routing between the nodes.

SUMMARY OF THE INVENTION

An object of the present invention is to provide a system and method for computing the path loss along a link between nodes in a wireless ad-hoc communications network using transmitted power level information contained in a received data packet and the receive signal strength indication (RSSI) at which the data packet is received.

Another object of the present invention is to provide a system and method for enabling a node, such as a mobile user terminal, in a wireless communications network, such as an 802.11 network, to compute the path loss along a link between itself and another node using the per-packet RSSI and the per-packet transmitted power level of data packets received and transmitted over that link, to thus determine the suitability of that link.

A further object of the present invention is to provide a system and method that provides for improved communication between nodes in an ad-hoc wireless communications network, in particular, an 802.11 network, by allowing the nodes to select the path having the least loss as a medium for transporting packets.

These and other objects are substantially achieved by providing a system and method for evaluating at least one communication link between a transmitting node and a receiving node in a communications network, such as a wireless ad-hoc communications network in accordance with the 802.11 standard. The system and method perform the operation of assigning respective link quality values to the respective communication links based on a transmit power level (TPL) value at which the respective data packets were transmitted by the transmitting node over the respective links, a received sensitivity (RS) value of the receiving node receiving the data packets, and a receive signal strength indication (RSSI) value provided by the network for each respective link. The system and method can examine a content of a data packet being sent between the two nodes to determine the TPL, and can receive the RSSI value from a physical layer of the communications network. Accordingly, the system and method can determine which link that additional data packets are to be sent by the transmitting node to the receiving node via the communication link based on the link quality values. Specifically, the link having the highest link quality value is selected.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
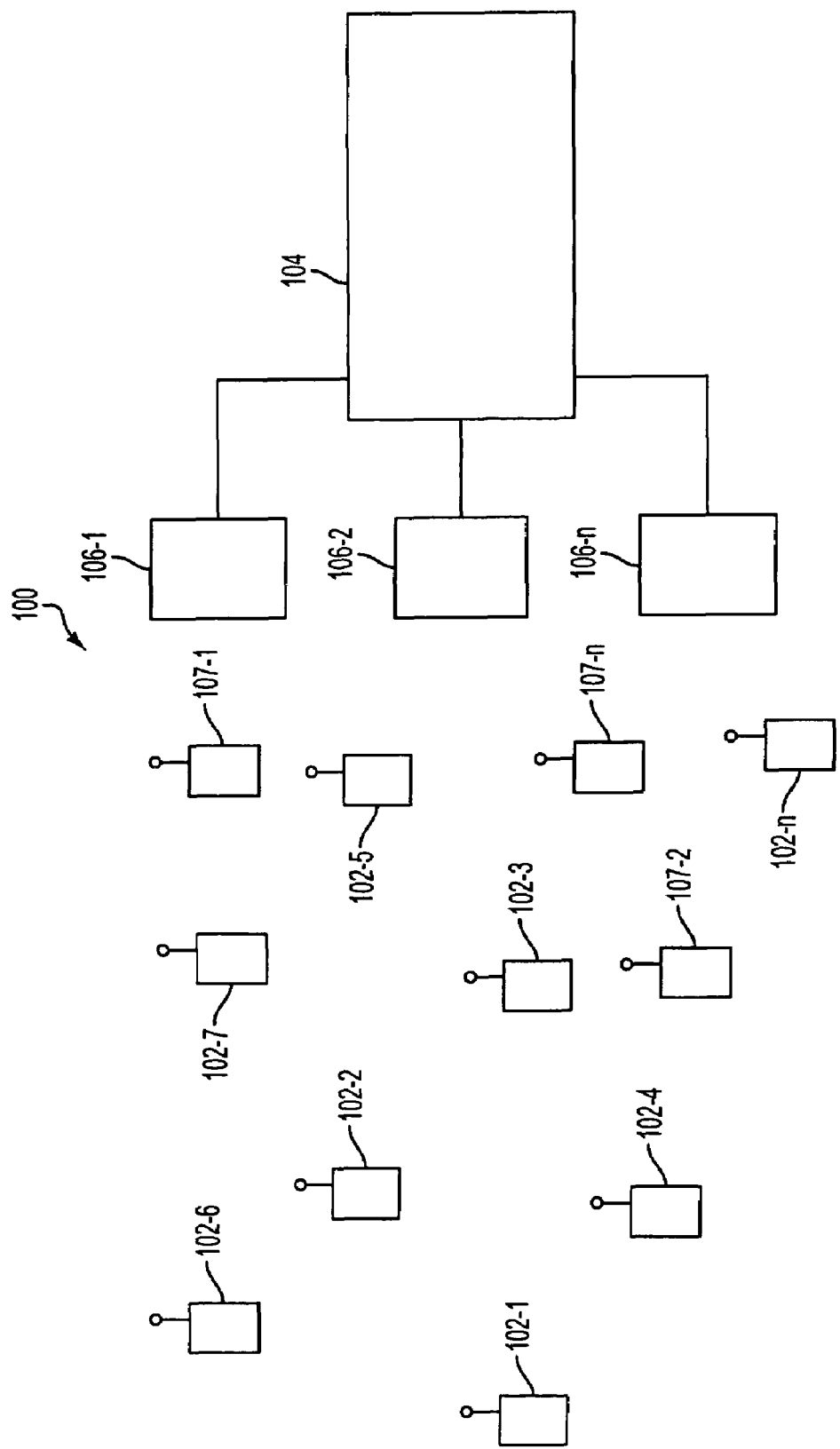
FIG. 1 is a block diagram of an example of an ad-hoc wireless communications network employing a system and method for evaluating the integrity of links between nodes according to an embodiment of the present invention.

FIG. 1 is a block diagram illustrating an example of an ad-hoc packet-switched wireless communications network 100 employing an embodiment of the present invention. Specifically, the network 100 includes a plurality of mobile wireless user terminals 102-1 through 102-n (referred to generally as nodes or mobile nodes 102), and a fixed network 104 having a plurality of access points 106-1, 106-2, . . . 106-n (referred to generally as nodes or access points 106), for providing the nodes 102 with access to the fixed network 104. The fixed network 104 includes, for example, a core local access network (LAN), and a plurality of servers and gateway routers, to thus provide the nodes 102 with access to other networks, such as other ad-hoc networks, the public switched telephone network (PSTN) and the Internet. The network 100 further includes a plurality of fixed routers 107-1 through 107-n (referred to generally as nodes or fixed routers 107) for routing data packets between other nodes 102, 106 or 107.

Figure 2:
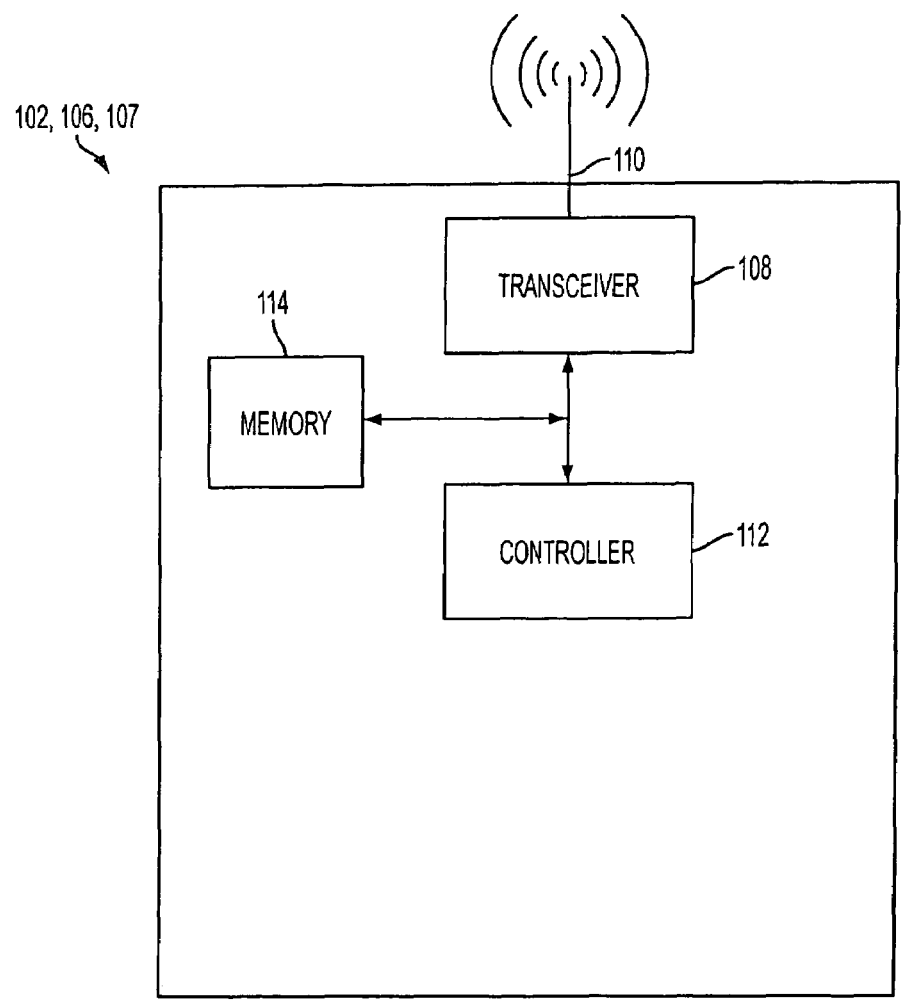
FIG. 2 is a block diagram illustrating an example of components of a node employed in the network shown in FIG. 1.

As can be appreciated by one skilled in the art, the nodes 102, 106 and 107 are capable of communicating with each other directly, or via one or more other nodes 102, 106 or 107 operating as a router or routers for data packets being sent between nodes 102, as described in U.S. Pat. No. 5,943,322 to Mayor and in U.S. patent application Ser. Nos. 09/897,790, 09/815,157 and 09/815,164, referenced above. Specifically, as shown in FIG. 2, each node 102, 106 and 107 includes a transceiver 108 which is coupled to an antenna 110 and is capable of receiving and transmitting signals, such as packetized data signals, to and from the node 102, 106 or 107, under the control of a controller 112. The packetized data signals can include, for example, voice, data or multimedia.

Each node 102, 106 and 107 further includes a memory 114, such as a random access memory (RAM), that is capable of storing, among other things, routing information pertaining to itself and other nodes 102, 106 or 107 in the network 100. The nodes 102, 106 and 107 exchange their respective routing information, referred to as routing advertisements or routing table information, with each other via a broadcasting mechanism periodically, for example, when a new node 102 enters the network 100, or when existing nodes 102 in the network 100 move. A node 102, 106 or 107 will broadcast its routing table updates, and nearby nodes 102, 106 or 107 will only receive the broadcast routing table updates if within broadcast range (e.g., radio frequency (RF) range) of the broadcasting node 102, 106 or 107. For example, assuming that nodes 102-1, 102-2 and 102-7 are within the RF broadcast range of node 102-6, when node 102-6 broadcasts its routing table information, that information is received by nodes 102-1, 102-2 and 102-7. However, if nodes 102-3, 102-4 and 102-5 through 102-n are out of the broadcast range, none of those nodes will receive the broadcast routing table information from node 102-6.

An example of the manner in which the integrity of a link is evaluated in accordance with an embodiment of the present invention will now be discussed with reference to FIGS. 1–4. Specifically, an embodiment of the present invention uses the available per-packet receive signal strength indication (RSSI) from an 802.11 physical layer combined with the per-packet transmitted power level to evaluate the path loss along a link for a packet sent within the network 100, which in this example is an 802.11 wireless network as discussed in the Background section above.

The per-packet path loss is used as a metric that determines the integrity of a link between two 802.11-compliant nodes 102, 106 or 107, as well as the probability that future packets will be successfully transmitted on the link between the two nodes. Routing algorithms in Layer II of the network 100, which is known as the switching layer as can be appreciated by one skilled in the art, can use this probability to eliminate links that have a low probability of successful packet delivery.

Figure 3:
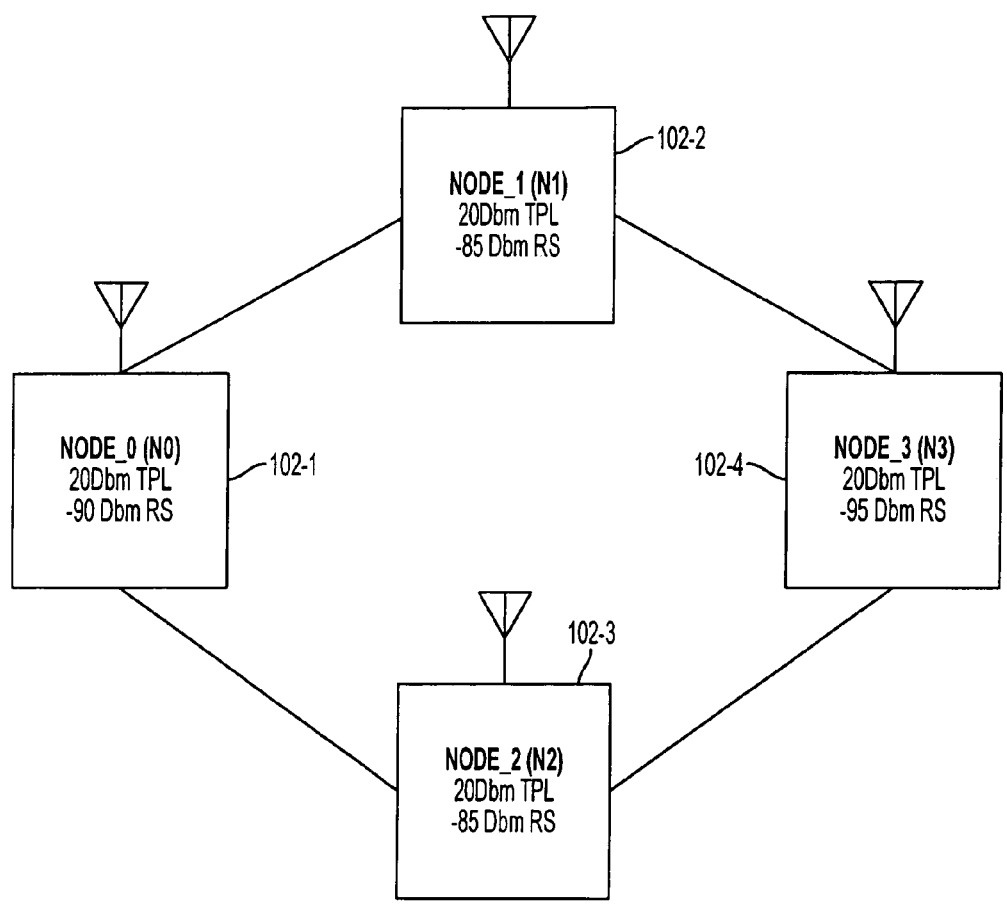
FIG. 3 is a block diagram depicting a comparison of path loss for two routes between nodes in the ad-hoc wireless communications network shown in FIG. 1 according to an embodiment of the present invention.

Referring to FIG. 3, four nodes 102-1, 102-2, 102-3 and 102-4, which are also identified as nodes N0, N1, N2 and N3, respectively, are depicted as forming two routes. The first route comprises nodes N0, N1 and N3, while the second route comprises nodes N0, N2 and N3. In this example, node N0 is the origination node and node N34 is the destination node, while nodes N1 and N2 are intermediate nodes. An example of the manner in which an embodiment of the present invention computes path loss will now be discussed in detail with respect to FIGS. 3–5.

Figure 4:
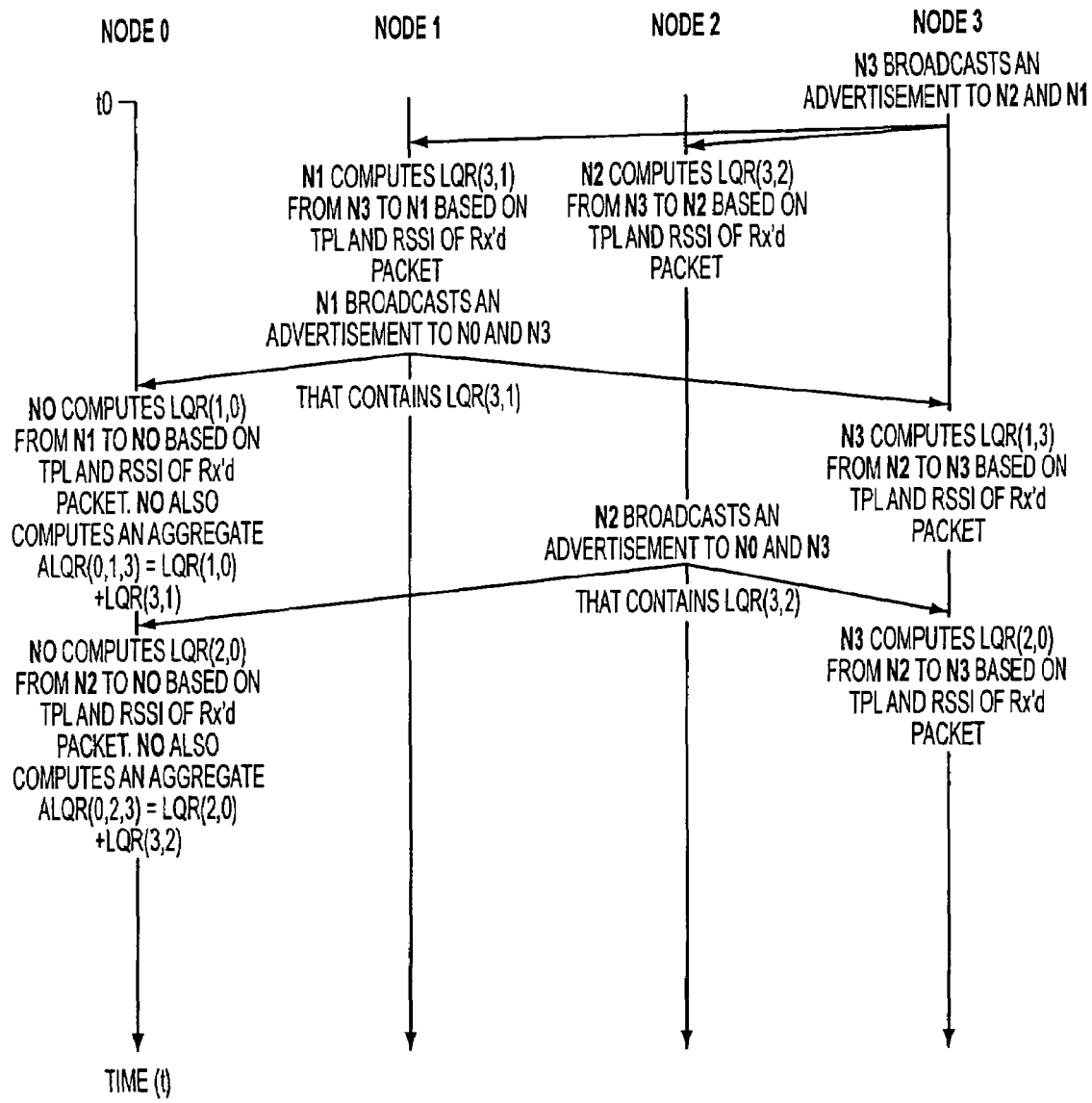
FIGS. 4 and 5 are timing diagrams illustrating an example of operations performed for computing a quality value for a link between nodes in the network shown in FIG. 1 according to an embodiment of the present invention.
Figure 5:
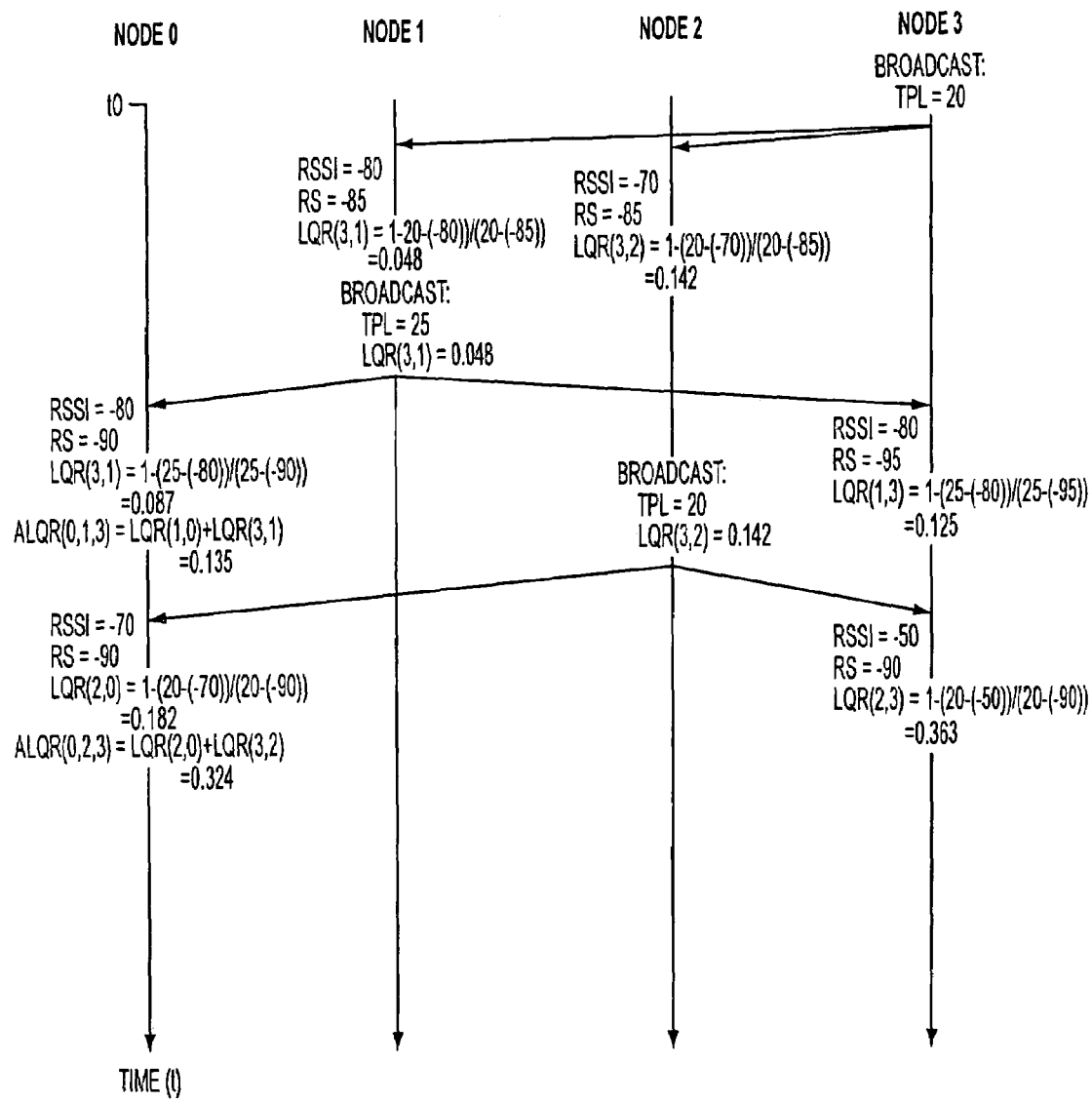

As shown in FIGS. 4 and 5, each node N0 through N3 in the network 100 periodically broadcasts routing advertisements to other nodes within its broadcast range. In this example, node N3 broadcasts routing advertisements to nodes N2 and N1 which are within the broadcast range of node N3. A broadcast routing advertisement includes information in its header pertaining to the transmit power level (TPL) in Decibels (Dbm). That is, prior to transmitting a packet, the controller 112 of node N3 causes this information to be included in the header of the packet. The RSSI is available from the 802.11 physical layer implementation Also, each node knows its receive sensitivity (RS), which is the lowest level signal strength at which a received signal containing a data packet can be received in order for the node to be able to successfully recover data from the received data packet. In other words, any signal received with a value less than the threshold RS value will be viewed as noise. The following equation represents an example of the manner in which the value of the link quality ratio (LQR) of the link from node N3 to node N2, and from node N3 to node N1, can be calculated that yields a ratio which can be used to measure the per packet link quality between wireless nodes in the network 100:

$$LQR=1-(TPL(Dbm)-RSSI(Dbm))/(TPL(Dbm)-RS(Dbm))$$

In this example, each node N0 through N3 in FIG. 3 has a TPL value of 20 Dbm. Node N0 has an RS value of −90 Dbm, nodes N1 and N2 each have an RS value of −85 Dbm, and node N3 has an RS value of −95 Dbm. In this example, the RSSI for the link from node N3 to node N2 is −70 Dbm, and the RSSI for the link from node N3 to node N1 is −80 Dbm. Accordingly, applying the LQR equation to the TPL, RS and RSSI values at node N2, a LQR value can be calculated by the controller 112 of node N2 as follows:

$$1-[((20\ Dbm-(-70\ Dbm))/(20\ Dbm-(-85\ Dbm))]\\=0.142\ LQR$$

The RSSI value for the link between nodes N3 and N2 is −80 Dbm. Applying the LQR equation as shown results in:

$$1-[((20\ Dbm-(-80\ Dbm))/(20\ Dbm-(-85\ Dbm))]\\=0.048\ LQR$$

As indicated, the route from node N3 to node N1 has a higher LQR value that the route from node N3 to node N2, which indicates that the route from node N3 to node N1 has a higher integrity level and there is thus a higher probability that future packets taking this route will have better success than if they took the route from node N3 to node N2. As further shown in FIGS. 4 and 5, node N1 broadcasts a routing advertisement to nodes N0 and N3 which are in the broadcast range of node N1. Nodes N0 and N3 calculate the respective LQR based on these received routing advertisements in the manner described above. It is further noted that the routing advertisements broadcast by node N1 includes information pertaining to the calculated LQR for the link from node N3 to node N1. Node N2 also broadcasts a routing advertisement to nodes N0 and N3 which are in the broadcast range of node N2. It is further noted that the routing advertisements broadcast by node N2 includes information pertaining to the calculated LQR for the link from node N3 to node N2.

The respective controllers 112 of nodes N0 and N3 thus calculate the respective LQR based on these received routing advertisements in the manner described above. It is also noted that node N0 is not shown as broadcasting any routing advertisements to any of the nodes within its broadcast range because, as discussed above, node N0 in this example is an origination node that sends a data packet to a destination node N3, and thus its routing advertisements are irrelevant for purposes of this description. However, like all nodes, node N0 would broadcast routing advertisements to the nodes in its broadcast range.

Furthermore, because node N0 is the origination node in this example, and is sending a data packet to destination node N3, the controller 112 of node N0 also calculates the aggregate link quality ratio (ALQR) for the two paths, namely, the path including nodes N0, N1 and N3, and the path including nodes N0, N1 and N3. Hence, node 0 calculates the ALQR for the path including nodes N0, N1 and N3 by adding the LQRs for the links N3 to N1 and N1 to N0 as calculated above. The ALQR for this path is calculated to be 0.135 as shown in FIG. 5. Similarly, node 0 calculates the ALQR for the path including nodes N0, N2 and N3 by adding the LQRs for the links N3 to N2 and N2 to N0 as calculated above. The ALQR for this path is calculated to be 0.324 as shown in FIG. 5. Assuming that all other variables are equal, the controller 112 of node N0 chooses the path having the highest ALQR, namely, the path including nodes N0, N2 and N3

As noted before, the check for LQR is done with the delivery of each packet. Thus, the technique according to the embodiment of the present invention described above provides a means of determining the best route on a continuous basis. Therefore, the mobility of the nodes 102 does not have a major effect on the quality of packet transmission for the wireless network 100. Furthermore, a running average of the LQR can be maintained by the source node N0 to determine the probable link reliability and can be used in determining which potential route to select. That is, over time, the LQR of the respective links can be accumulated to provide a more statistically meaningful measure of the quality of the links.

It can be assumed that future packets taking the selected route will also have a higher LQR value. However, as noted above, the check for LQR values is done continuously. Therefore, future selected routes can change based on the LQR values changing for presently used routes. For example, presently used routes can have LQR values that diminish. In another example, presently used routes can maintain the same LQR value, but unused routes can have an increase in LQR value.

It will also be appreciated by those skilled in the art that although the technique is described above in relation to 802.11 protocols, the technique invention can be modified to include other protocols and still fall within the scope of the present invention. For example, the techniques described above can be employed in other types of wireless mediums, such as Home RF, Bluetooth, and so on.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A system, adapted for use in a communications network, for evaluating at least one communication link between a transmitting node and a receiving node in the communications network, the system comprising:
a processor for assigning a link quality value to said communication link based on a transmit power level (TPL) value at which said data packet was transmitted by said transmitting node, a received sensitivity (RS) value of said receiving node receiving said data packet, and a receive signal strength indication (RSSI) value provided by said network; and wherein said processor calculates said link quality value as a link quality ratio (LQR) represented by the equation

LQR=1−(TPL−RSSI)/(TPL−RS).

2. A system as claimed in claim 1, further comprising:
a packet analyzer for examining a content of a data packet being sent between said two nodes to determine said TPL.

3. A system as claimed in claim 1, wherein:
said processor receives said RSSI value from a physical layer of said communications network.

4. A system as claimed in claim 1, wherein:
said processor determines whether additional data packets are to be sent by said transmitting node to said receiving node via said communication link based on said link quality value.

5. A system as claimed in claim 1, wherein:
said network includes an ad-hoc wireless communications network; and
said processor assigns said link quality value to said communication link between said transmitting and receiving nodes which are each wireless nodes in said ad-hoc wireless communications network.

6. A system as claimed in claim 1, wherein:
said network includes an 802.11-type network; and
said processor assigns said link quality value to said communication link between said transmitting and receiving nodes which are each wireless 802.11-type nodes in said 802.11-type network.

7. A system as claimed in claim 1, wherein:
said processor assigns a respective said link quality value to each respective one of said communication links between said transmitting and receiving nodes.

8. A system as claimed in claim 7, wherein:
said processor selects one of said communication links as a selected route via which additional data packets are to be sent by said transmitting node to said receiving node via said communication link based on said link quality value.

9. A system as claimed in claim 8, wherein:
said processor selects as said selected route one of said communications links having the highest link quality value.

10. A system as claimed in claim 1, wherein:
said processor assigns said link quality value on a per packet basis.

11. A method for evaluating at least one communication link between a transmitting node and a receiving node in a communications network, the method comprising:
assigning a link quality value to said communication link based on a transit power level (TPL) value at which said data packet was transmitted by said transmitting node, a received sensitivity (RS) value of said receiving node receiving said data packet, and a receive signal strength indication (RSSI) value provided by said network; and
wherein said assigning calculates said link quality value as a link quality ratio (LQR) represented by the equation

LQR=1−(TPL−RSSI)/(TPL−RS).

12. A method as claimed in claim 11, further comprising:
examining a content of a data packet being sent between said two nodes to determine said TPL.

13. A method as claimed in claim 11, further comprising:
receiving said RSSI value from a physical layer of said communications network.

14. A method as claimed in claim 11, further comprising:
determining whether additional data packets are to be sent by said transmitting node to said receiving node via said communication link based on said link quality value.

15. A method as claimed in claim 11, wherein:
said network includes an ad-hoc wireless communications network; and
said assigning signs said link quality value to said communication link between said transmitting and receiving nodes which are each wireless nodes in said ad-hoc wireless communications network.

16. A method as claimed in claim 11, wherein:
said network includes an 802.11-type network; and
said assigning assigns said link quality value to said communication link between said transmitting and receiving nodes which are each wireless 802.11-type nodes in said 802.11-type network.

17. A method as claimed in claim 11, wherein:
said assigning assigns a respective said link quality value to each respective one of said communication links between said transmitting and receiving nodes.

18. A method as claimed in claim 17, further comprising:
selecting one of said communication links as a selected route via which additional data packets are to be sent by said transmitting node to said receiving node via said communication link based on said link quality value.

19. A method as claimed in claim 18, wherein:
said selecting selects as said selected route one of said communications links having the highest link quality value.

20. A method as claimed in claim 11, wherein:
said assigning assigns said link quality value on a per packet basis.

21. A computer-readable medium of instructions, adapted for use with a communications network for evaluating at least one communication link between a transmitting node and a receiving node in the communications network, the instructions comprising:
a first set of instructions for assigning a link quality value to said communication link based on a transmit power level (TPL) value at which said data packet was transmitted by said transmitting node, a received sensitivity (RS) value of said receiving node receiving said data packet, and a receive signal strength indication (RSSI) value provided by said network; and
wherein said first set of instructions calculates said link quality value as a link quality ratio (LQR) represented by the equation

LQR=1−(TPL−RSSI)/(TPL−RS).

22. A computer-readable medium of instructions as claimed in claim 21, further comprising:
a second set of instructions for examining a content of a data packet being sent between said two nodes to determine said TPL.

23. A computer-readable medium of instructions as claimed in claim 21, further comprising:
a third set of instructions for obtaining said RSSI value from a physical layer of said communications network.

24. A computer-readable medium of instructions as claimed in claim 21, further comprising:
a fourth set of instructions for determining whether additional data packets are to be sent by said transmitting node to said receiving node via said communication link based on said link quality value.

25. A computer-readable medium of instructions as claimed in claim 21, wherein:
said network includes an ad-hoc wireless communications network; and
said first set of instructions assigns said link quality value to said communication link between said transmitting and receiving nodes which are each wireless nodes in said ad-hoc wireless communications network.

26. A computer-readable medium of instructions as claimed in claim 21, wherein:
said network includes an 802.11-type network; and
said first set of instructions assigns said link quality value to said communication link between said transmitting and receiving nodes which are each wireless 802.11-type nodes in said 802.11-type network.

27. A computer-readable medium of instructions as claimed in claim 21, wherein:
said first set of instructions assigns a respective said link quality value to each respective one of said communication links between sad transmitting and receiving nodes.

28. A computer-readable medium of instructions as claimed in claim 27, further comprising:
a fifth set of instructions for selecting one of said communication links as a selected route via which additional data packets are to be sent by said transmitting node to said receiving node via said communication link based on said link quality value.

29. A computer-readable medium of instructions as claimed in claim 28, wherein:
said fifth set of instructions selects as said selected route one of said communications links having the highest link quality value.

30. A computer-readable medium of instructions as claimed in claim 21, wherein:
said first set of instructions assigns said link quality value on a per packet basis.

31. A system as claimed in claim 1, wherein:
said processor is employed in said receiving node.

32. A system as claimed in claim 31, wherein:
said receiving node is a mobile wireless node in said communications network.

33. A system as claimed in claim 5, wherein:
said processor is employed in said receiving node.

34. A system as claimed in claim 33, wherein:
said receiving node is mobile.

35. A system as claimed in claim 6, wherein:
said processor is employed in said receiving node.

36. A system as claimed in claim 35, wherein:
said receiving node is mobile.

37. A method as claimed in claim 11, wherein:
said receiving node performs said assigning step.

38. A method as claimed in claim 37, where:
said receiving node is a mobile wireless node in said communications network.

39. A method as claimed in claim 15, wherein:
said receiving node performs said assigning step.

40. A method as claimed in claim 39, wherein:
said receiving node is mobile.

41. A method as claimed in claim 16, wherein:
said receiving node performs said assigning step.

42. A method as claimed in claim 41, wherein:
said receiving node is mobile.

43. A computer-readable medium of instructions as claimed in claim 21, wherein:
said first set of instructions controls said receiving node to assign a link quality value to said communication link based on a transmit power level (TPL) value at which said data packet was transmitted by said transmitting node, a received sensitivity (RS) value of said receiving node riving said data packet, and a receive signal strength indication (RSSI) value provided by said network.

44. A computer-readable medium of instructions as claimed in claim 43, wherein:
said receiving node is a mobile wireless node in said communications network.

45. A computer-readable medium of instructions as claimed in claim 25, wherein:
said first set of instructions controls said receiving node to assign a link quality value to said communication link based on a transmit power level (TPL) value at which said data packet was transmitted by said transmitting node, a received sensitivity (RS) value of said receiving node receiving said data packet, and a receive signal strength indication (RSSI) value provided by said network.

46. A computer-readable medium of instructions as claimed in claim 45, wherein:
said receiving node is mobile.

47. A computer-readable medium of instructions as claimed in claim 26, wherein:
said first set of instructions controls said receiving node to assign a link quality value to said communication link based on a transmit power level (TPL) value at which said data packet was transmitted by said transmitting node, a received sensitivity (RS) value of said receiving node receiving said data packet, and a receive signal strength indication (RSSI) value provided by said network.

48. A computer-readable medium of instructions as claimed in claim 47, wherein:
said receiving node is mobile.

* * * * *